Figure 1:
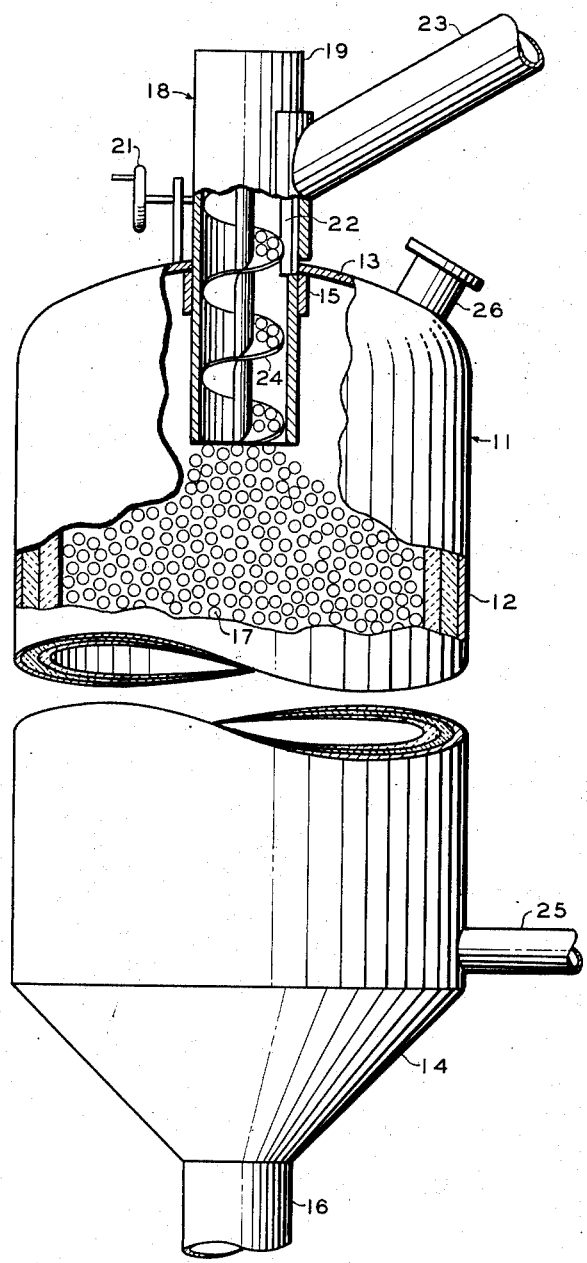

Oct. 21, 1952 L. J. WEBER 2,614,824
PEBBLE HEAT EXCHANGER
Filed Oct. 11, 1948 2 SHEETS—SHEET 1

INVENTOR.
L. J. WEBER
BY Hudson and Young
ATTORNEYS

Oct. 21, 1952 — L. J. WEBER — 2,614,824
PEBBLE HEAT EXCHANGER
Filed Oct. 11, 1948 — 2 SHEETS—SHEET 2

INVENTOR.
L. J. WEBER
BY Hudson and Young
ATTORNEYS

Patented Oct. 21, 1952

2,614,824

UNITED STATES PATENT OFFICE 2,614,824

PEBBLE HEAT EXCHANGER

Louis J. Weber, Bartlesville, Okla., assignor to Phillips Petroleum Company, a corporation of Delaware Application October 11, 1948, Serial No. 53,876

2 Claims. (Cl. 263—19)

This invention relates to pebble heat exchangers. In one of its more specific aspects, it relates to improved pebble heater chambers. In another of its more specific aspects, it relates to an improved method for operating pebble heater chambers.

Thermal conversion processes carried on in so-called pebble heater apparatus utilize a flowing mass of pebbles which is heated to a high temperature in a first direct heat exchange step and is then caused to contact gaseous materials furnishing heat thereto in a second direct heat exchange. The conventional pebble heater apparatus comprises two chambers which may be disposed in substantially vertical alignment. Solid heat exchange material, such as refractory pebbles, is ordinarily introduced into the upper portion of a first chamber and is allowed to drop vertically to a point at which a fluid bed of such solid heat exchange material is formed by such dropping pebbles. The solid heat exchange material flows downwardly through the pebble heater chamber in direct heat exchange with a hot gaseous heat exchange material. The solid heat exchange material is heated to a high temperature in such a heat exchange and passes as a pebble stream into a second chamber in which the pebbles are caused to contact a second gaseous material in a second direct heat exchange relation furnishing heat thereto.

The term "pebbles" as used herein denotes any solid refractory material of flowable form, size and strength which is suitable to carry large amounts of heat from the pebble heating chamber to the gas heating chamber. Pebbles conventionally used in such pebble heater apparatus are substantially spherical in shape and are from about one-eighth inch to about one inch in diameter. In high temperature processes the pebbles must be formed of a refractory material which will withstand temperatures at least as high as the highest temperature attained in the pebble heater chamber. The pebbles must also be capable of withstanding any temperature changes within the apparatus. A refractory material, such as a metal, ceramic or other satisfactory material may be utilized to form such pebbles. Suitable pebbles may be formed of silicon carbide, alumina, periclase, beryllia, zirconia, and mullite, separately, in admixture with each other or with other materials. Pebbles formed of such materials, when properly fired, serve very well in high temperatures, some withstanding temperatures up to about 3500° F. Pebbles which are inert or catalytic may be used in any selected process.

Most conventional pebble heaters are provided with a combustion chamber adjacent or in close proximity to the lower portion of the first or upper chamber. Hot combustion gas from the combustion chamber is introduced through the side or bottom of the upper chamber, better known as the pebble heating chamber. Pebbles which pass downwardly through the heating chamber contact the rising combustion gas and are heated as above described. In a pebble bed formed within such a chamber, as much as sixty per cent by volume of the pebble bed is substantially static. For that reason, flue gases passing up through the static portion of the pebble bed leave the top of the bed at a relatively high temperature which results in a loss of considerable amounts of heat. Another disadvantage of such a pebble heater chamber is that most of the pebbles which are utilized in such a heat exchange are quite brittle and fracture quite easily when dropped vertically onto a hard surface, such as the top of the fluid pebble bed within the pebble heater apparatus.

An object of this invention is to provide means to substantially reduce pebble breakage in pebble heat exchangers. Another object of this invention is to provide a method to substantially reduce pebble breakage in pebble heat exchangers. Another object of this invention is to provide means and a method to obtain more economic utilization of the heat exchange step within the upper chamber of pebble heat exchangers. Another object of this invention is to reduce the amount of mechanical shock to which pebbles are subjected in pebble heater chambers. Another object of this invention is to substantially eliminate free vertical drop of pebbles in pebble heater apparatus. Another object of this invention is to provide means for easily varying the depth of a pebble bed within pebble heater chambers. Other and further objects and advantages will be apparent upon study of the accompanying disclosure.

Figure 4:
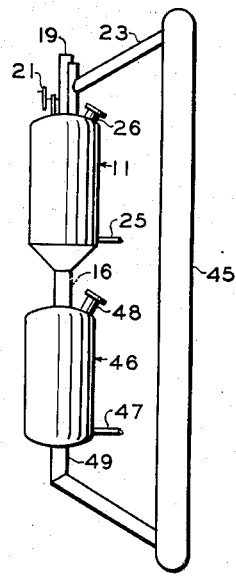
Figure 2:
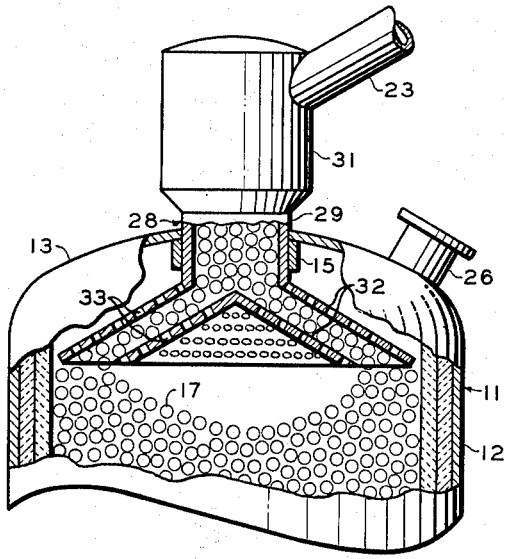
Figure 3:
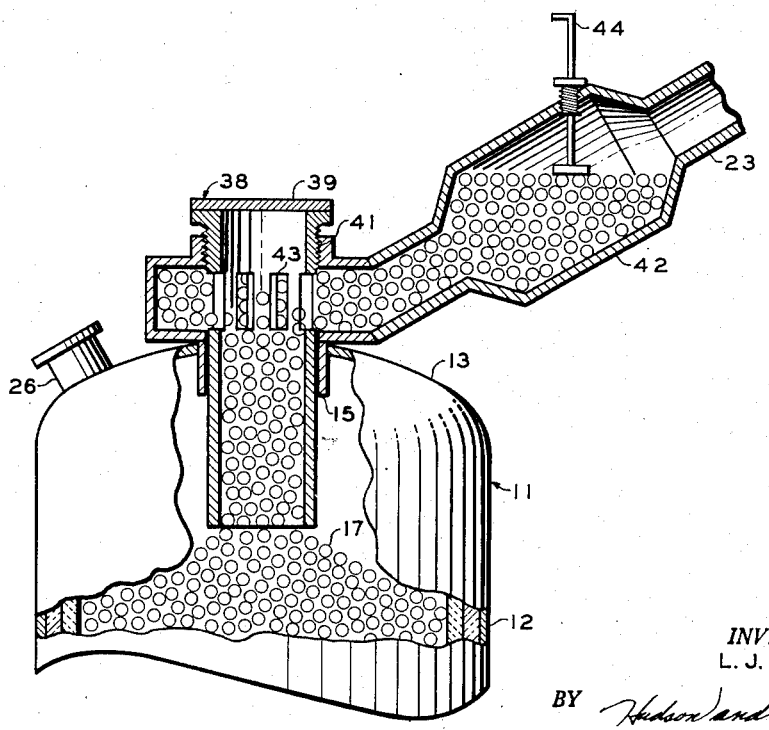

Understanding of the invention will be facilitated upon reference to the attached drawings in which Figure 1 is a broken section elevation of a pebble heater chamber embodying the invention. Figure 2 is a broken section elevation of a preferred modification of the invention. Figure 3 is a broken section elevation of another modification of the invention. Figure 4 is a schematic view of a pebble heater apparatus showing the relation between the pebble heater and gas heater chambers and the path of pebble recycle.

In the device shown in Figure 1 of the drawing, pebble heater chamber 11 comprises a shell 12 which is closed at its upper and lower ends by closure members 13 and 14, respectively. Closure member 13 is provided in its upper end with a pebble inlet opening 15, preferably centrally positioned therein. Pebble outlet conduit 16 is provided in closure member 14. Shell 12 may be lined with insulating material of any type which will insulate the shell from the high temperatures to which pebbles within the chamber are ordinarily subjected. A fluid mass of pebbles 17 is provided within heater chamber 11 so as to form a contiguous pebble bed therein. A pebble flow control 18 is provided in pebble inlet opening 15 so as to prevent the pebbles from dropping vertically into the pebble heater chamber. Pebble flow control 18 comprises a pebble inlet conduit 19 which extends downwardly through pebble inlet opening 15 to the top of the pebble bed within chamber 11. Conduit 19 extends upwardly above closure member 13 for a considerable distance and is adjustably retained in position by adjusting member 21 which communicates with conduit member 19 by a pinion arrangement or some other suitable operative connection. Conduit member 19 is provided in one of its sides with at least one perforation 22 which provides communication between the interior of conduit 19 and pebble supply conduit 23. A helix is provided within pebble conduit 19 and extends from its lower end portion upwardly to and preferably extends above the perforate portion of conduit 19. Gaseous heat exchange material inlet conduits 25 are provided in the lower portion of chamber 11 and effluent outlet conduit 26 is provided in the upper portion of chamber 11.

In the operation of the device shown in Figure 1 of the drawing, pebbles are supplied through supply conduit 23 and pass laterally through perforation 22 into the interior of pebble inlet conduit 19. The in-flowing pebbles pass onto the surface of helix 24 and pass downwardly through a circuitous route along the surface of the helix to the upper surface of the pebble bed within chamber 11. Gaseous heat exchange material is injected into chamber 11 through inlet conduits 25. The heat exchange material may be in the form of combustion gases or may be passed into the pebble heating chamber in the form of combustible materials and burned therein in a combustion chamber provided therefor to form combustion gases. The combustion gases pass upwardly through the fluid pebble bed and gaseous effluent materials are removed from chamber 11 through effluent outlet conduit 26. Heated pebbles are withdrawn from chamber 11 through pebble outlet conduit 16. Conduit 19 may be raised or lowered by manipulation of adjusting member 21 so as to vary the depth of the pebble bed within chamber 11 as desired. Perforation 22 is of sufficient length to allow passage of pebbles therethrough regardless of the positioning of conduit 19.

In a device shown in Figure 2 of the drawing, pebble heater chamber 11 is somewhat similar to that shown in Figure 1 and comprises outer shell 12 which is closed at the upper end by closure member 13, which closure member is provided with a pebble inlet opening 15. A fluid bed of pebbles 17 is provided within chamber 11. Pebble flow control 28 comprises a pebble inlet conduit 29 which extends downwardly through pebble inlet opening 15. Pebble inlet conduit 29 is provided in its upper end portion with an enlarged section 31 which forms a pebble surge chamber therein. The lower portion of conduit 29 is formed by concentric cones 32 which are provided with perforations 33. Cones 32 provide an annular passage extending from the tubular section of conduit 29 downwardly and outwardly to the surface of the pebble bed adjacent the inner wall of chamber 11. Lower cone 32 is affixed to and supported by support members, not shown, extending between upper and lower cones 32. Pebble supply conduit 23 extends laterally into the upper portion of enlarged conduit section 31. Effluent outlet conduit 26 is provided in the upper end portion of chamber 11.

In the operation of the device shown in Figure 2 of the drawing, pebbles are supplied to pebble heater chamber 11 through pebble supply conduit 23 downwardly and laterally into the enlarged conduit portion 31 of conduit 19. A constantly replaced column of pebbles is formed within conduits 31, 29, and the annular conduit formed between cones 32 and extends downwardly to the upper surface of a pebble bed formed within chamber 11. As pebbles are withdrawn from the bottom of chamber 11, the pebble column within pebble inlet conduit 29 carries the incoming pebbles downwardly therethrough to the upper surface of the pebble bed. In that manner, vertical drop of pebbles flowing into the pebble heater chamber is substantially eliminated and considerable saving in material is effected by the reduction of breakage. Gaseous heat exchange material passing upwardly through chamber 11 is caused to pass through perforate cones 32 and through that portion of the pebble column within the annular conduit formed by the perforate cones 32.

In the device shown in Figure 3 of the drawing, chamber 11 is also somewhat similar to that shown in Figure 1 and comprises outer shell 12 which is provided in its upper end with closure member 13, which closure member is provided with pebble inlet opening 15 and effluent outlet 26. A fluid bed of pebbles 17 is provided within chamber 11. Pebble flow control 38 comprises pebble inlet conduit 39 extending downwardly through pebble inlet opening 15 and which conduit is replaceably affixed in place by fastener means, such as threaded section 41. Pebble supply conduit 23 is provided with an enlarged section 42, which forms a pebble surge chamber therein, and is closed at its end adjacent pebble inlet conduit 39 so as to form an annular chamber about conduit 39. Conduit 39 is provided with perforations 43 within the closed portion of supply conduit 23, which perforations provide communication between supply conduit 23 and the interior of pebble inlet conduit 39. A constantly changing column of pebbles is provided within pebble inlet conduit 39 and extends from the upper surface of the pebble bed within chamber 11 to a perforate section of conduit 39. Pebble supply conduit 23 is ordinarily maintained full of pebbles at least a portion of the distance up and outward through enlarged conduit section 42 therein. Pebble level gauge 44 extends slidably through the upper surface of enlarged conduit section 42. Pebble level gauge 44 may comprise a float which may be raised or lowered by hand so as to determine the level of pebbles within enlarged conduit section 42. In that manner, it is possible to determine when additional pebbles should be added to the heater system. Effluent outlet conduit 26 is provided in the upper end portion of chamber 11.

In the operation of the device shown in Figure 3 of the drawing, pebbles are supplied through pebble supply conduit 23 and pass into enlarged portion 42 of the conduit without being subjected to a vertical drop therein. A constantly available pebble supply is thus provided for the pebble heater. The pebbles pass downwardly and laterally along conduit 23 through perforations 43 in pebble inlet conduit 39 and are carried downwardly to the upper surface of the pebble bed within chamber 11 by a constantly replaced flowing column of pebbles within pebble inlet conduit 39 as pebbles are withdrawn from the lower portion of chamber 11. If it is desired to vary the depth of the pebble bed within chamber 11, pebble inlet conduit 39 may be removed and a pebble inlet conduit of a different length may be inserted and affixed in pebble inlet opening 15.

The device shown in Figure 1 or the modifications of Figure 2 or Figure 3 may be utilized in the pebble heater chamber of the pebble heater apparatus schematically shown in Figure 4 of the drawing. Pebbles are introduced into chamber 11 through pebble supply conduit 23 and pebble inlet conduit 19. Gaseous heat exchange materials are admitted through conduit 25 and are caused to flow upwardly through the downwardly flowing mass of pebbles within chamber 11 and outwardly through effluent outlet conduit 26. Pebbles are withdrawn through pebble outlet conduit 16 and flow downwardly into lower chamber 46 through which a second gaseous heat exchange material which is to be heated is admitted into chamber 46 through inlet conduit 47 and is passed in a second heat exchange relation upwardly through the downwardly flowing mass of pebbles in chamber 46. Effluent materials are removed from the upper portion of chamber 46 through effluent outlet conduit 48 and pebbles are withdrawn from the lower portion of chamber 46 through pebble outlet conduit 49. The pebbles are then passed upwardly by means of elevator 45 to pebble supply conduit 23. Any conventional structure may be utilized for the introduction of gaseous heat exchange material into the pebble heater apparatus at the desired temperature. It should be noted that in the apparatus shown and described as Figure 4 of the drawing, the upper chamber of which may be chamber 11 of Figures 1, 2, or 3, a contiguous bed of pebbles is maintained from the upper portion of pebble inlet conduits 19, 29, or 39, through pebble outlet conduit 49 in chamber 46 to elevator 45. Conduit 23 is preferably disposed at an angle slightly in is maintained from the upper portion of pebble utilized within the pebble heater apparatus. The pebbles are thus caused to roll through conduit 23 onto the pebbles within the pebble surge chamber or pebble conduit without encountering a point of vertical drop.

The method and device disclosed in connection with the modification of Figure 2 of the drawing are especially adaptable to the best utilization of heat input into the pebble heater chamber as well as eliminating the free drop of pebbles being introduced into the pebble heater chamber. The gaseous heat exchange material flows upwardly from the surface of the pebble bed, passes through the perforations in the cones 32 and downwardly flowing layers of pebbles formed between cones 32 and passes upwardly and out of chamber 11 through effluent outlet conduit 26. In this manner more contact between non-static pebbles and the hot effluent gas is assured than would be possible with conventional pebble heater arrangements.

Though this invention is particularly applicable to the heating of pebbles for thermal conversion or similar thermal gas treating or heating processes, it is also adaptable to processes in which refrigeration of fluids is desired by heat exchange between pebbles cooled to a low temperature and gaseous heat exchange material.

As will be evident to those skilled in the art, various other modifications of this invention can be made or followed in the light of the disclosure and discussion without departing from the spirit or scope of such disclosure.

I claim:

1. A pebble heat exchange chamber which comprises in combination an upright closed outer shell having a pebble outlet in its lower end portion; at least one upright pebble inlet conduit in the upper end of said chamber and forming the sole pebble inlet means thereto, each said inlet conduit extending downwardly into the upper portion of shell only to the desired pebble bed level therein and each inlet conduit having an inlet opening in its upper portion; a helix within each said upright pebble inlet conduit being closely encompassed by said pebble inlet conduit, closing said conduit except for the helical path formed thereby and extending from the lower end of the conduit to the pebble inlet opening in said conduit; a heat exchange fluid inlet in the lower portion of said shell; and gaseous effluent outlet means in the upper portion of said shell.

2. A pebble heat exchange chamber which comprises in combination an upright closed outer shell having a pebble outlet in its lower end portion; an upright pebble inlet conduit having a pebble inlet opening in its upper portion, centrally positioned, closely fitted and slidably retained in and extending downwardly into the upper portion of said shell only to the desired pebble bed level therein; a drive member affixed on said shell and in operational communication with said pebble inlet conduit, adapted to vary the distance to which said pebble inlet conduit is extended into said shell; a helix within said upright pebble inlet conduit, said helix being closely encompassed by said pebble inlet conduit, and closing said conduit except for the helical path formed thereby and extending from the lower end of said conduit to said pebble inlet opening in said conduit; a heat exchange fluid inlet in the lower portion of said shell; and gaseous effluent outlet means in the upper portion of said shell.

LOUIS J. WEBER.

REFERENCES CITED

The following references are of record in the file of this patent:

UNITED STATES PATENTS

| Number | Name | Date |
|---|---|---|
| 552,127 | Howie | Dec. 31, 1898 |
| 735,919 | Tregidgo | Aug. 11, 1903 |
| 745,689 | Tanner et al. | Dec. 1, 1903 |
| 1,447,071 | Giesecke | Feb. 27, 1923 |
| 2,268,535 | Schutte | Dec. 30, 1941 |
| 2,399,450 | Ramseyer | Apr. 30, 1946 |
| 2,423,411 | Simpson | July 1, 1947 |
| 2,437,383 | Dalton | Mar. 9, 1948 |
| 2,439,372 | Simpson | Apr. 6, 1948 |
| 2,441,335 | Sinclair | May 11, 1948 |
| 2,443,337 | Weber | June 15, 1948 |
| 2,447,306 | Bailey | Aug. 17, 1948 |
| 2,451,924 | Crowley | Aug. 19, 1948 |
| 2,468,712 | Kohler | Apr. 26, 1949 |

FOREIGN PATENTS

| Number | Country | Date |
|---|---|---|
| 154,510 | Great Britain | Dec. 2, 1920 |